US012751794B1

(12) United States Patent
Golden

(10) Patent No.: US 12,751,794 B1
(45) Date of Patent: Oct. 6, 2026

(54) DENTAL EXTRACTION KIT, ASSEMBLY AND PROCESS FOR REMOVING AN EMBEDDED ROOT OF ANY BROKEN TOOTH, CROWN OR MOLAR

(71) Applicant: Richard M. Golden Family LLC, Grosse Pointe, MI (US)

(72) Inventor: Richard M. Golden, Grosse Pointe, MI (US)

(73) Assignee: Richard M. Golden Family LLC, Grosse Pointe, MI (US)

( * ) Notice: Subject to any disclaimer, the term of this patent is extended or adjusted under 35 U.S.C. 154(b) by 0 days.

(21) Appl. No.: 19/207,666

(22) Filed: May 14, 2025

(51) Int. Cl.
*A61C 3/02* (2006.01)
*A61C 1/12* (2006.01)
*A61C 3/14* (2006.01)

(52) U.S. Cl.
CPC .................. *A61C 3/02* (2013.01); *A61C 1/12* (2013.01); *A61C 3/14* (2013.01)

(58) Field of Classification Search
CPC ....... A61C 3/14; A61C 3/16–168; A61C 3/02; A61C 1/08; A61C 1/084; A61C 1/12; A61C 1/14; A61C 1/142; A61C 8/0089; A61C 8/0039; A61C 8/006; A61B 17/1637; A61B 17/1673; A61B 17/1695; A61B 17/1635; Y10S 408/703
See application file for complete search history.

(56) References Cited

U.S. PATENT DOCUMENTS

| | | | | |
|---|---|---|---|---|
| 6,089,867 | A * | 7/2000 | Filho | A61C 8/0006 433/175 |
| 6,210,161 | B1 * | 4/2001 | Montgomery | A61C 3/14 433/146 |
| 7,128,575 | B1 * | 10/2006 | Sohn | A61C 3/14 81/418 |
| 8,235,721 | B2 * | 8/2012 | Bagambisa | A61C 8/0089 433/201.1 |
| 10,342,637 | B2 * | 7/2019 | Sajid | A61B 17/2816 |
| 2009/0274996 | A1 * | 11/2009 | Miller | A61C 1/084 433/165 |

(Continued)

FOREIGN PATENT DOCUMENTS

WO WO-2009151276 A2 * 12/2009 ............... A61C 8/00

OTHER PUBLICATIONS

Translation of WO2009151276A2 (Year: 2026).*

*Primary Examiner* — Heidi M Eide
*Assistant Examiner* — Shannel Nicole Belk
(74) *Attorney, Agent, or Firm* — Dinsmore & Shohl LLP

(57) ABSTRACT

A kit and assembly for removing embedded dental roots including the provision of multiple drill sleeves of varying diameter and configurations which drill into the bone around the embedded root in order to progressively shape a retrieval profile surrounding the embedded root to be removed. According to a non-limiting preferred embodiment, a series of three drill sleeves are employed for shaping the profile for subsequent insertion of a uniquely configured retrieval forceps for gripping the embedded root surfaces revealed by the drill rings for easy removal. In this fashion, removal of the embedded root is facilitated without inflicting undue damage to the surrounding bone. As further explained, the kit can be reconfigured as required for removing multiple embedded molar root tips of varying configurations.

6 Claims, 9 Drawing Sheets

(56) References Cited

U.S. PATENT DOCUMENTS

| | | | | |
|---|---|---|---|---|
| 2013/0280674 | A1* | 10/2013 | Maksim | A61C 8/0069<br>433/173 |
| 2014/0065573 | A1* | 3/2014 | Wang | A61B 17/1615<br>433/166 |
| 2021/0052356 | A1* | 2/2021 | Elgh | A61C 1/186 |
| 2022/0160371 | A1* | 5/2022 | Huwais | A61B 17/1615 |

* cited by examiner

DENTAL EXTRACTION KIT, ASSEMBLY AND PROCESS FOR REMOVING AN EMBEDDED ROOT OF ANY BROKEN TOOTH, CROWN OR MOLAR

FIELD OF THE INVENTION

The present invention relates generally to dental extraction assemblies. More specifically, the present invention teaches a kit and assembly which includes a plurality of configured drill rings or sleeves which progressively shape a depth extending concentric profile of decreasing diameter rings or sleeves through either of the upper maxillary or lower mandibular bone adjacent and surrounding an embedded root for facilitating subsequent removal by a separate forceps instrument for gripping opposite surfaces of the exposed root.

BACKGROUND OF THE INVENTION

The prior art discloses numerous tooth and root removal articles and implements.

US 2024/0325112 teaches a cutting tool with hollow shaft exhibiting end cutting teeth for removing a broken endodontic instrument.

U.S. Pat. No. 7,938,645 which teaches a dental system for root and root tip extraction having a flexible extraction bur with a sharp first end with a lifting element to which a lifting force is applied. An extraction instrument causes the tooth portion to be extracted from its root socket.

CN219895948 teaches a ring sleeve drill for tooth root shield forming and operation.

US 2015/0024346 discloses a method of removing oral root tips and including a removal instrument with finger grip coupled to a conical radial tip having a spiral cutting screw for anchoring into the root tip to be removed.

A related root tip extractor is shown in US 2010/0119991 having a burr including a helical structure inserted against a tooth portion for exerted friction during manipulation for extracting.

US 2009/0098509 teaches a dental tooth extraction implement and method including a wedge-shaped extraction rod inserted into a predrilled root to induce dislodgement from its natural socket seating prior to removal.

U.S. Pat. No. 10,905,525 teaches a medical tool for removing tooth fragments including roots having a needle including retentive and drilling sections.

SUMMARY OF THE INVENTION

The present invention discloses a kit and assembly for removing embedded dental roots of any type of tooth, such including the provision of multiple drill sleeves or rings of progressively decreasing diameter and configuration which are drilled into the upper or lower jaw bone around the embedded root, in order to progressively shape a retrieval profile of decreasing concentric annular recessed shaped rings surrounding the embedded root to be removed.

Any plurality of drill sleeves are employed for shaping the retrieval profile surrounding and exposing the root tip for subsequent insertion of a uniquely configured retrieval forceps for gripping the root tip on opposite sides for easy removal. In this fashion, removal of the embedded root is facilitated without inflicting undue damage to the surrounding bone, this facilitating subsequent installation of posts for securing dental prostheses or implants. As will be further explained, the kit can be reconfigured as required for removing multiple embedded root tips of varying configurations which are associated with any tooth, crown or molar. In the further instance of a crown, it is typically removed or ground down to the surface of the gumline and bone for accessing the embedded roots.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With reference to the attached illustrations, the present invention discloses a kit and assembly for removing embedded dental roots including the provision of multiple drill sleeves of progressively decreasing diameter and configuration which successively drill into the bone around the embedded root, in order to progressively shape a retrieval profile defined by successive decreasing concentric rings in order to expose the embedded root to be removed. As will be further described, the present invention can include without limitation both human and veterinary applications.

As will be further described, a variety of non-limiting preferred embodiments are disclosed which incorporate any plurality of drill sleeves for shaping the profile for subsequent insertion of a uniquely configured retrieval forceps for gripping the embedded root surfaces revealed by the drill rings for easy removal. In this fashion, removal of the embedded root is facilitated without inflicting undue damage to the surrounding bone, such further facilitating the subsequent installation of dental prostheses or implants. As further explained, the kit can be reconfigured as required for removing multiple embedded molar root tips of varying configurations.

Figure 1:
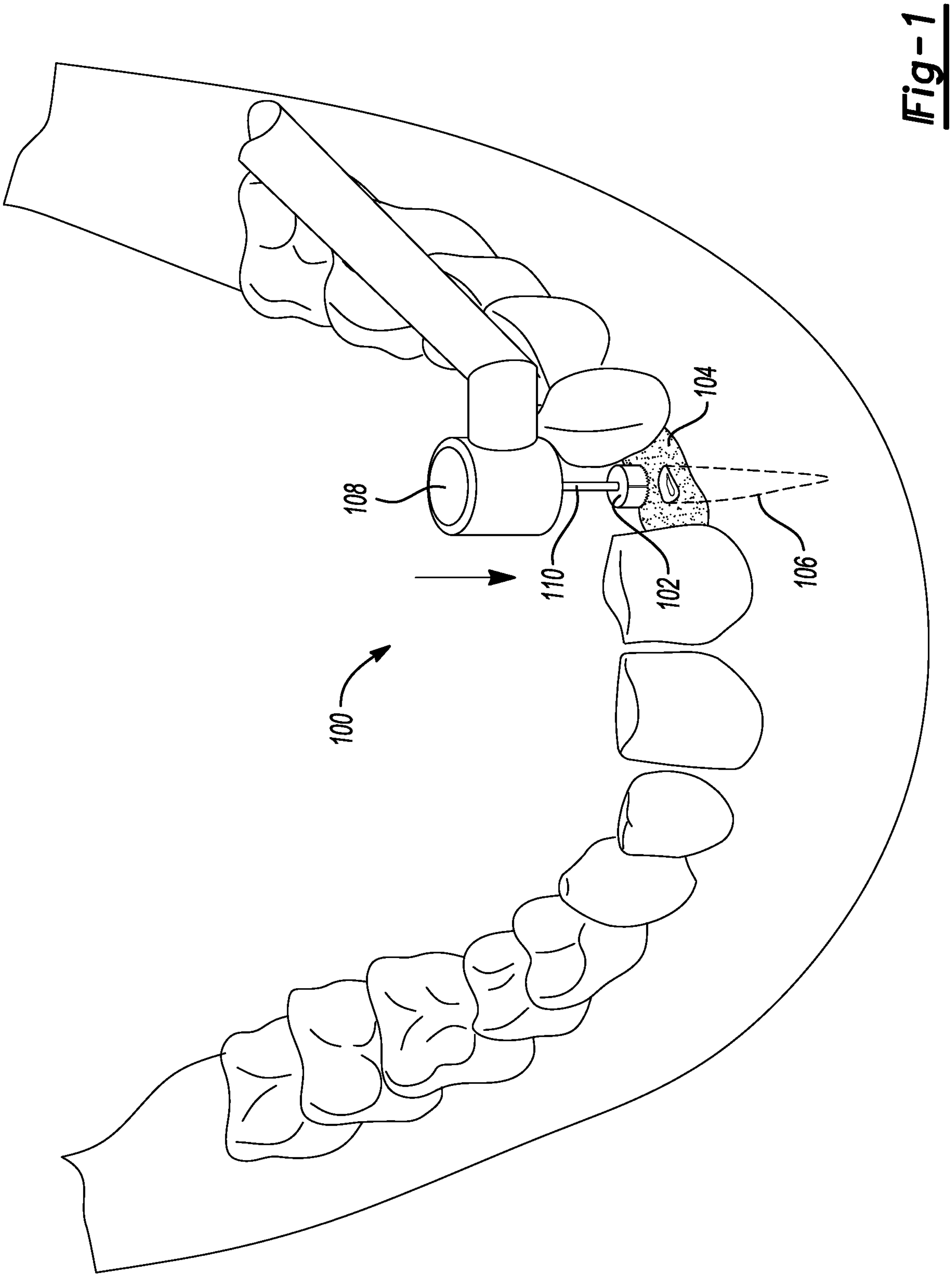
FIG. 1 is an environmental illustration of the dental root extraction kit and including a drill sleeve positioned for drilling an initial ring shape within the bone directly adjacent and surrounding the embedded root tip.
Figure 4:
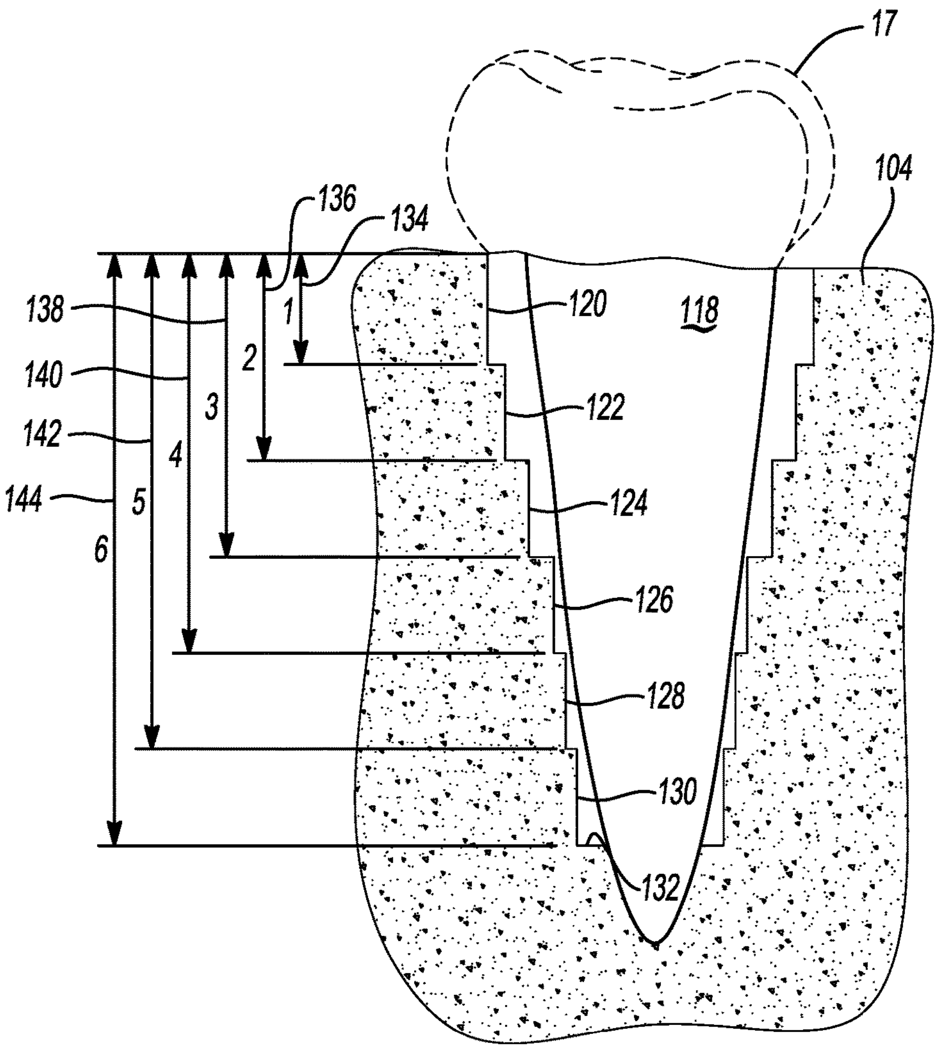
FIG. 4 depicts a non-limiting variant of the present invention in which a series of several drill sleeves of progressively narrowing concentric diameter are employed for defining the three dimensional profile in the bone surrounding the root tip.

Referencing initially FIG. 1, an environmental illustration is provided, generally at 100, of a dental root extraction kit and including a selected drill sleeve 102 positioned for drilling an initial ring shape within an exposed lower mandibular bone 104, such that the recessed profile formed is directly adjacent and surrounding an embedded root tip 106 (subsequent reference being made to FIG. 4 et seq.). A conventional dental drill is depicted at 108 and which includes a head configured for receiving an inserting stem 110 of the drill sleeve 102.

Although not shown, the head portion of the drill 108 incorporates a head bearing, gear box and bur latch. A collet and chuck, also not shown, can also be integrated into the drill head for securing the drill sleeve stem 110 and, as is known, is a specialized clamping device designed to securely hold the drill sleeve. The collet is a cylindrical sleeve, typically made of spring steel or other elastic materials, having a tapered end which allows it to compress and expand. The chuck body is a housing that holds and tightens the collet, providing the mechanism for applying a clamping force such that, when the collet is tightened within the chuck body, it compresses around the workpiece or cutting tool, creating a firm and even clamping force. This design ensures that the workpiece remains stable, centered, and free of slippage even under high-speed rotation or cutting forces.

Figure 2C:
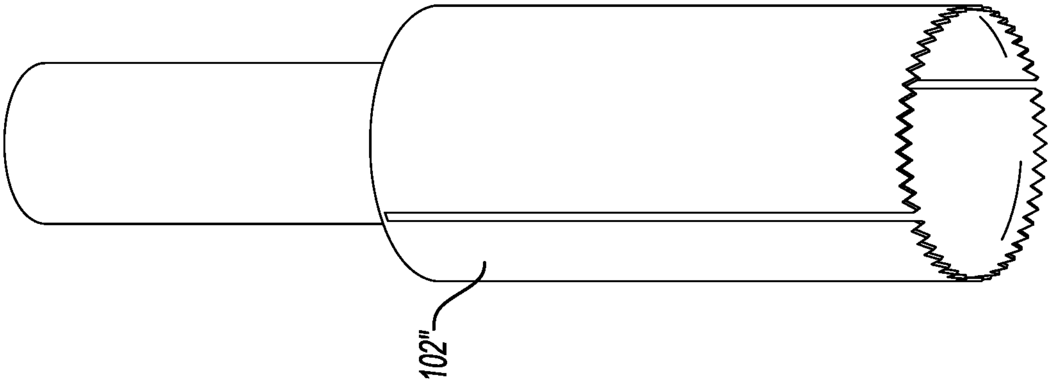
FIGS. 2A-2C depict a series of drill sleeves of varying diameter which are used in descending succession when drilling a three dimensional profile within the bone surrounding the root tip in order to facilitate its removal.
Figure 2B:
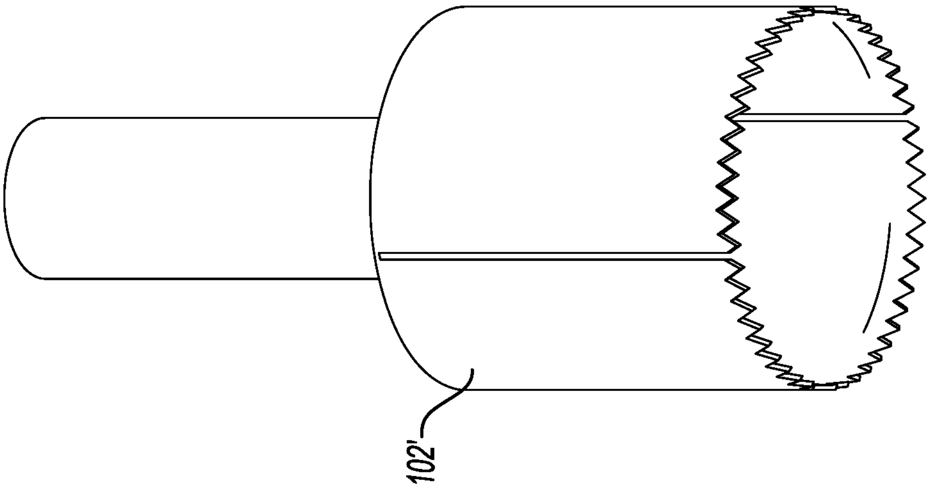
Figure 2A:
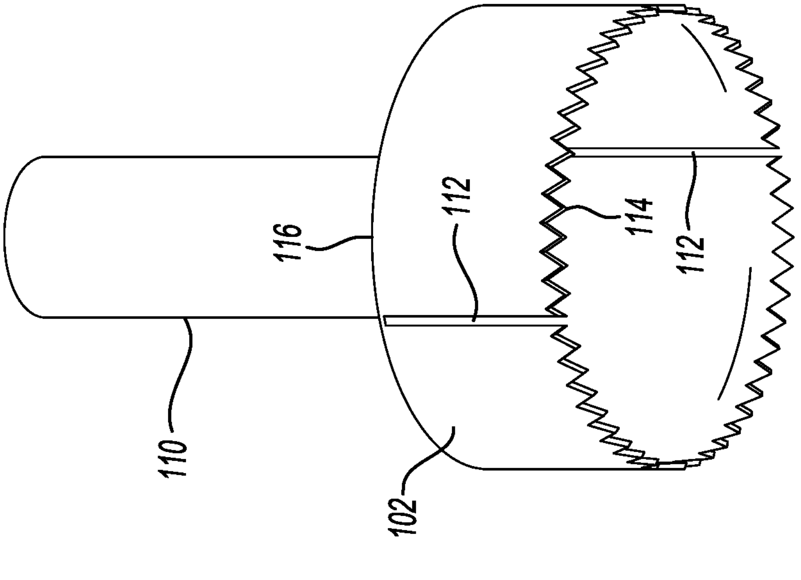

Referring to FIGS. 2A-2C, depicted are a series of drill sleeves of varying diameter (see again at 102 as well as at 102' and 102") which are used in descending succession when drilling a three dimensional profile within the bone surrounding the root tip in order to facilitate its removal. Each of the drill sleeves or rings can be constructed of any suitable material such as a medical grade steel and/or a high carbon content sanitary plastic or similar outer coating applied over the steel substrate. As further shown, the drill sleeves 102, 102', 102'. As further shown, one or more axial slots (see at 112 for selected drill sleeve 12) can optionally extend from a serrated or toothed circular open end profile 114 to an inner end wall 116 in turn supporting the drill stem 110, defining the cylindrical shape of the drill sleeve in order to provide a measured degree of flex or bend during drilling within the upper maxillary or lower mandibular jaw bone.

Although not shown, a set of the drill sleeves are provided as a kit which are capable of forming any depth defining 3D profile of decreasing concentric rings in order to expose any embedded root tip associated with any of a crown, molar or tooth. The collection or kit of drill sleeves can be organized within a case or similar holding enclosure for ease of access and selection.

Figure 3B:
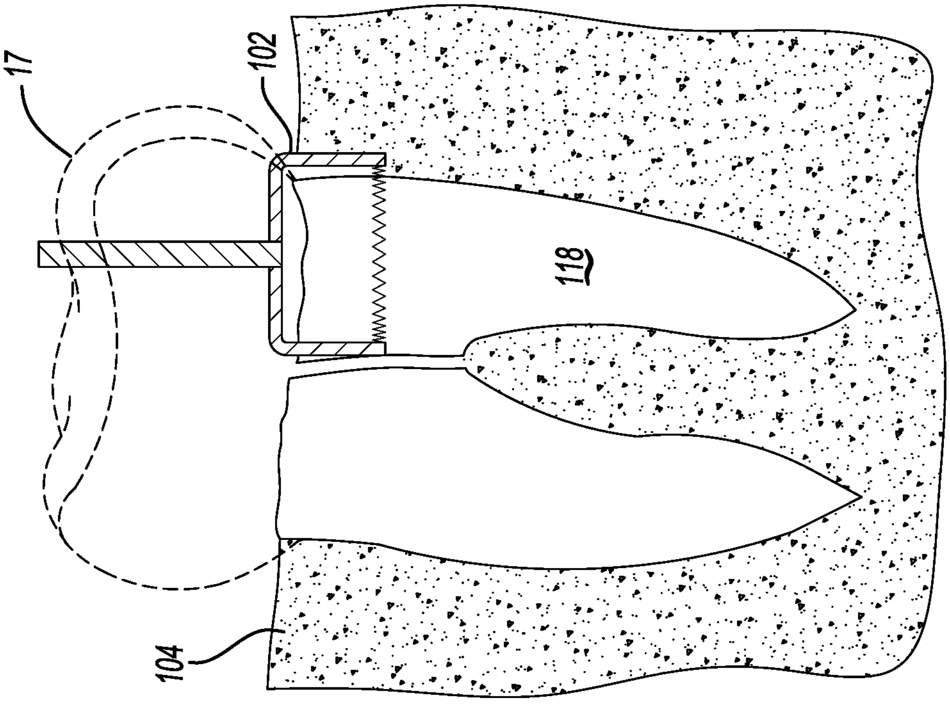
FIGS. 3A-3B illustrate a variant of the invention including a crown which is removed above the gum line prior to an initial drill ring such as shown in FIG. 2A being formed in the bone surrounding the remaining embedded root tip.
Figure 3A:
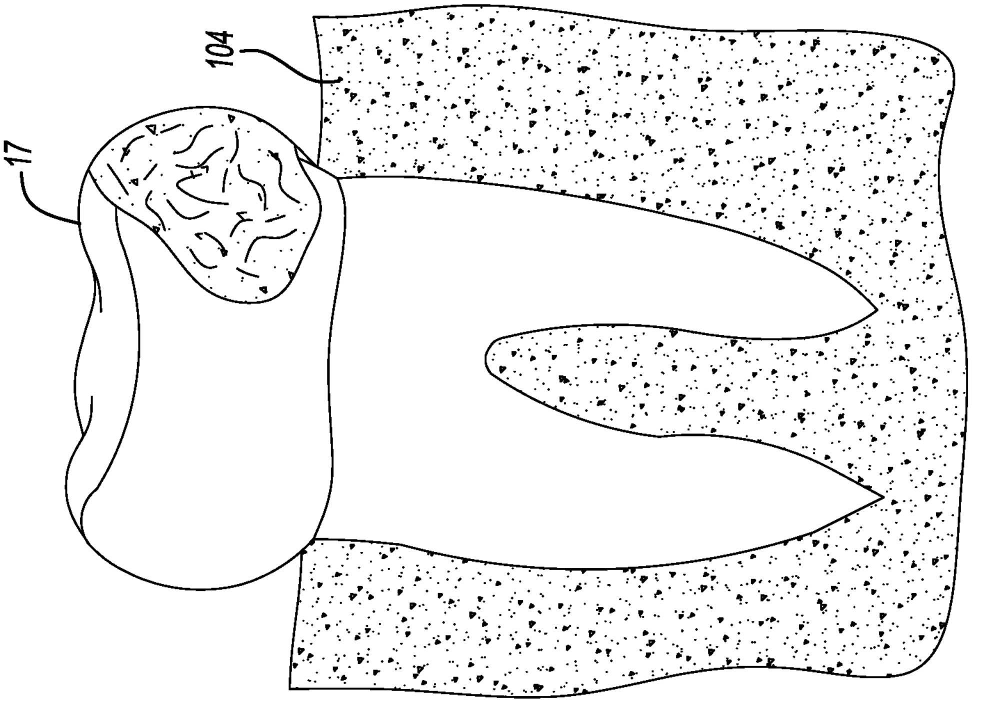
Figure 7A:
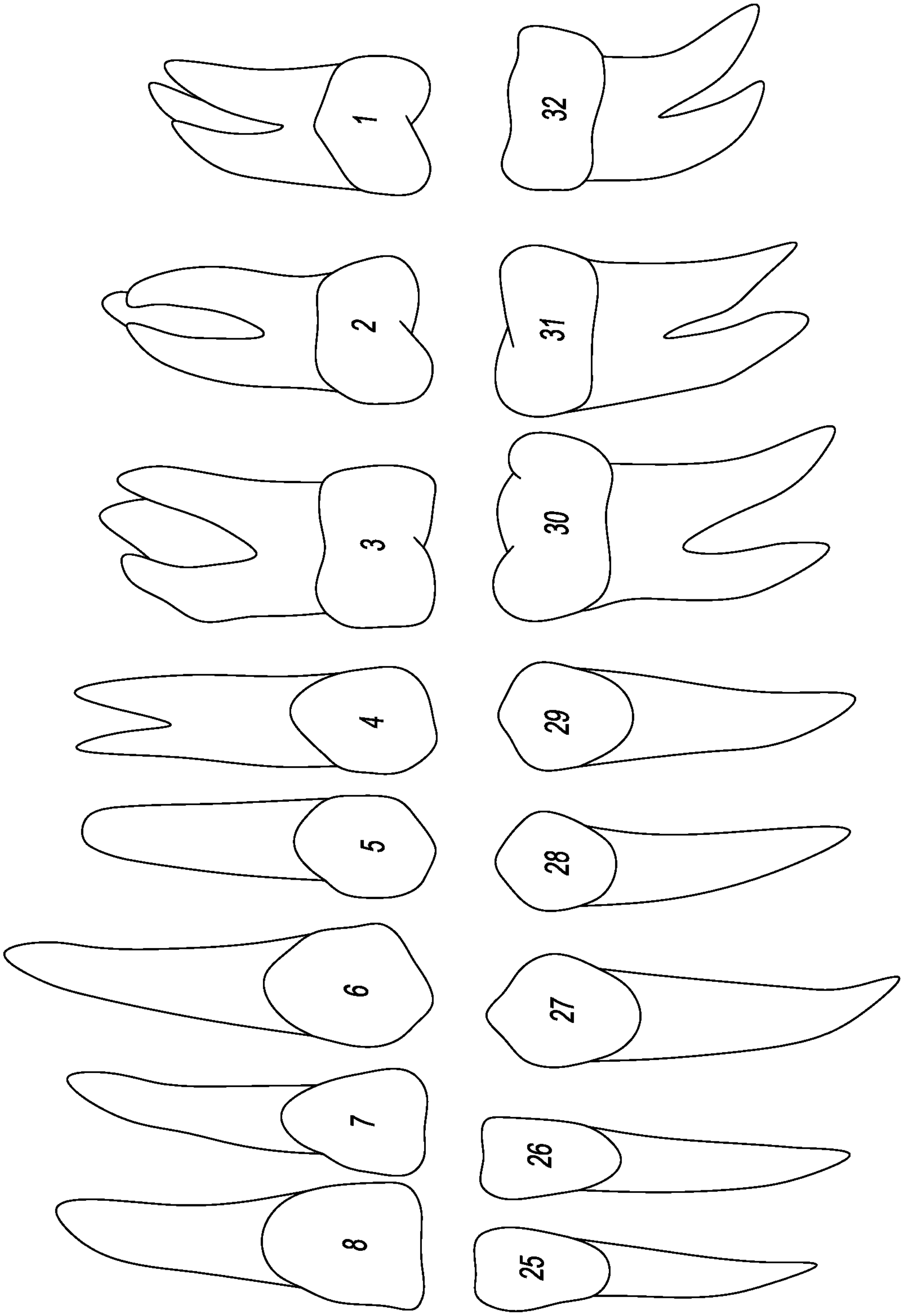
FIGS. 7A-7B illustrate upper and lower arrangements of teeth and molars as shown from each of first and second sides.
Figure 7B:
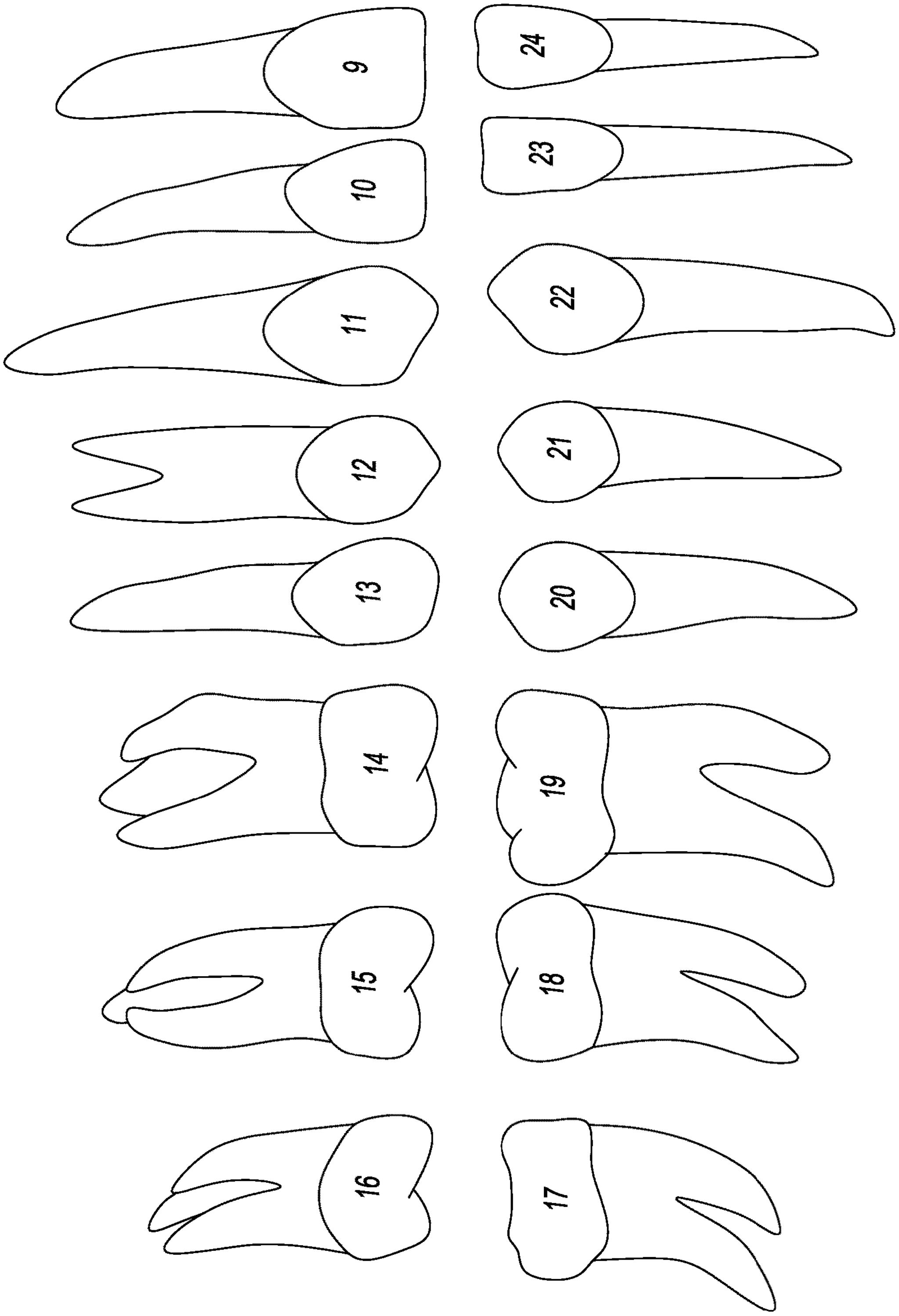

Proceeding to FIGS. 3A-3B, illustrated is a variant of the invention including a crown (such as for example representatively shown at 17 but which is representative of any of 17/18/19 or 30/31/32 in depicted in FIGS. 7A-7B). In operation, the potentially damaged or partially broken crown is removed (see FIG. 3B) above the gum line (according to any conventional drill technique), thereby revealing the exposed root tips (see for example at 118) and prior to an initial drill ring, such as previously shown in FIG. 2A at 102, being employed to form an initial ring or sleeve shaped annular recess profile into the bone (see again at 104) surrounding selected root tip 118.

FIG. 4 depicts a non-limiting variant of the present invention in which a series of several drill sleeves of progressively narrowing concentric diameter are employed for defining the three dimensional profile in the bone surrounding the root tip. This can include a ninety-degree rotated view of the embedded root tip 118 shown in FIG. 4.

A series of successive annular recesses, beginning with initial recess 120 corresponding to initial drill ring 102, are formed into the mandibular bone 104 and are further represented by concentric and progressively reduced diameter recesses 122, 124, 126, 128 and 130, terminating at bottom end wall 132. As shown, first recess profile 120 corresponds to a first drill sleeve operation to a depth 134, second inner concentric profile 122 in a second drill sleeve operation to a further depth 136, with further successive inner concentric formed recessed 124, 126, 128, and 130, further corresponding to successive drill operations 138, 140, 142 and 144 which extends to the bottom end wall 132.

As further understood, the also progressively remove outer portions of the dental root 118 itself (not shown) in order to extend the recessed profile latter drill sleeve operations (140, 142, 144), depicted in FIG. 4 by recess profiles at 126, 128 and 130, may in order to substantially reveal the majority of the roots to permit subsequent removal by the forceps.

As further shown, the 3D retrieval profile formed by the successively reduced diameter drill rings/sleeves 102, 102', 102" et. seq. is shaped in order to remove a minimal amount of bone material surrounding the embedded root tip 118. Without limitation, the present invention contemplates any plurality of drill sleeves, such as ranging from three to several, for progressively forming the retrieval profile in the bone for exposing the embedded root tip to be removed. It is also understood that the present invention contemplates additional techniques for assisting in removal of the bone debris resulting from each succeeding drilling operation and which can include the use of vacuum tubes, picks or other implements.

Figure 5:
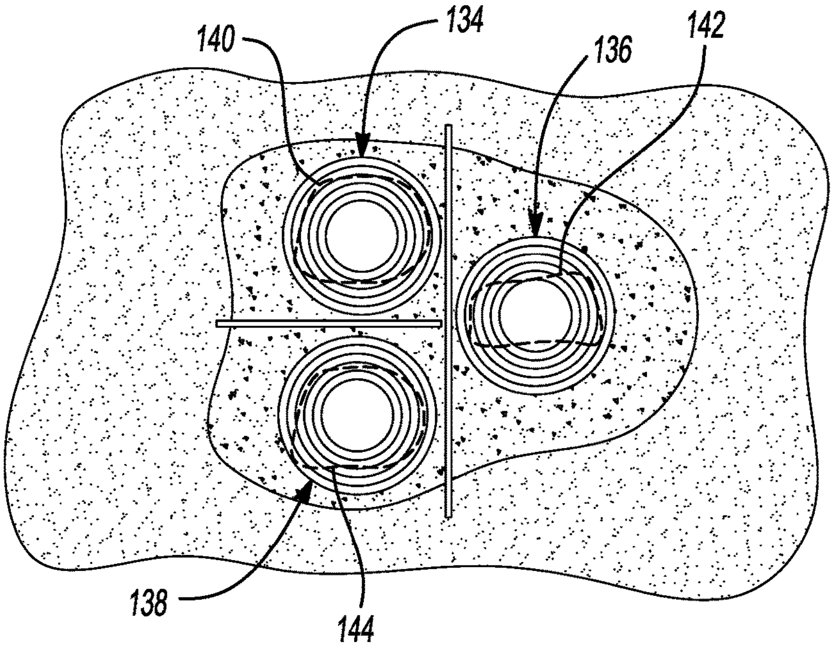
FIG. 5 provides an overhead illustration of concentric ring profiles similar to as shown in FIG. 4 for removing a plurality of root tips associated with such as a molar.

Proceeding to FIG. 5 it provides an overhead illustration of an arrangement of concentric ring profiles (see as generally representatively shown at 134, 136, and 138) similar as shown in FIG. 4 for removing a plurality of three root tips associated with such as a molar. As is known, a canine tooth or incisor usually have a single root, with molar teeth typically having two or three roots. The maxillary or upper molars usually have three roots (mesial, distal and buccal) with the mandibular or lower molars usually having two roots (mesial and distal). That said, there can be variations in the number of roots depending on the individual tooth and the person's anatomy with, in rare cases, a molar having four or even five roots.

Further shown at 140, 142 and 144 are overhead outlines in phantom of two dimensional profiles of embedded root tips to be removed and which correspond to the concentric ring profiles 134, 136 and 138. This complementing illustration is meant to highlight the advantages of the present invention in removing the minimal amount of bone necessary for removing the embedded root tip, such again allowing for subsequent installation of anchors for an associated implant or dental prosthesis.

Figure 6B:
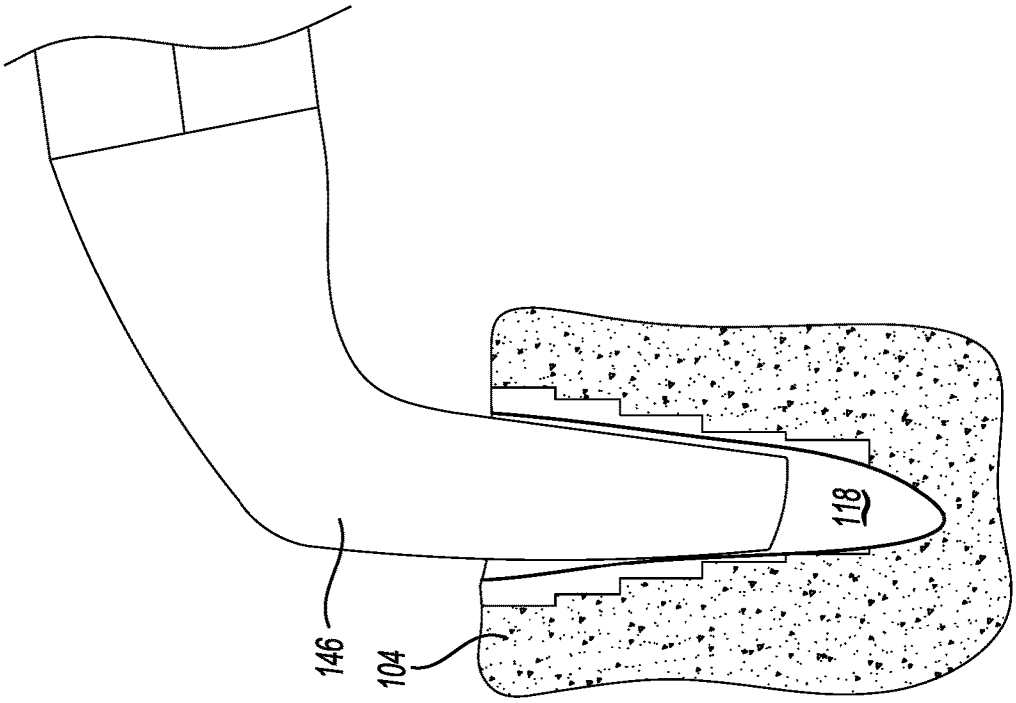
FIGS. 6A-6B illustrate successive root tip removal steps employing the forceps of the present kit inserted within the drilled profile similar to that shown in FIG. 4.
Figure 6A:
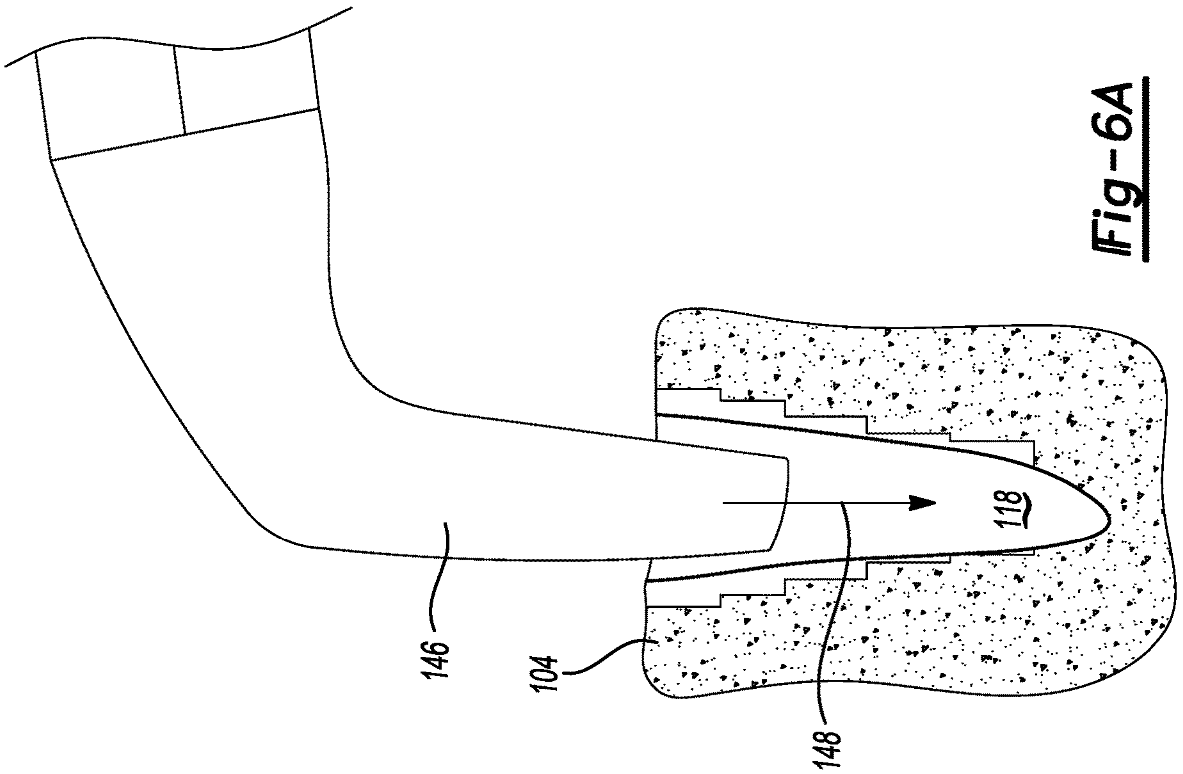

FIGS. 6A-6B illustrate successive root tip removal steps employing a uniquely configured dental forceps (see selected jaw 146) of the present kit, which is inserted within the drilled profile similar to that shown in FIG. 4. Specifically, the forceps include first and second pivotally associated jaws, each of which exhibit a narrowed and thin material cross section which permit the jaws to be inserted (see directional arrow 148 in FIG. 6A) within the drilled profile surrounding the exposed root tip 118. Although not shown, it is also envisioned that the tips of each of the forceps jaws can exhibit a slightly concave contour which facilitates better gripping of the opposite surfaces of the revealed root tip (FIG. 6B) for subsequent removal.

Figure 8A:
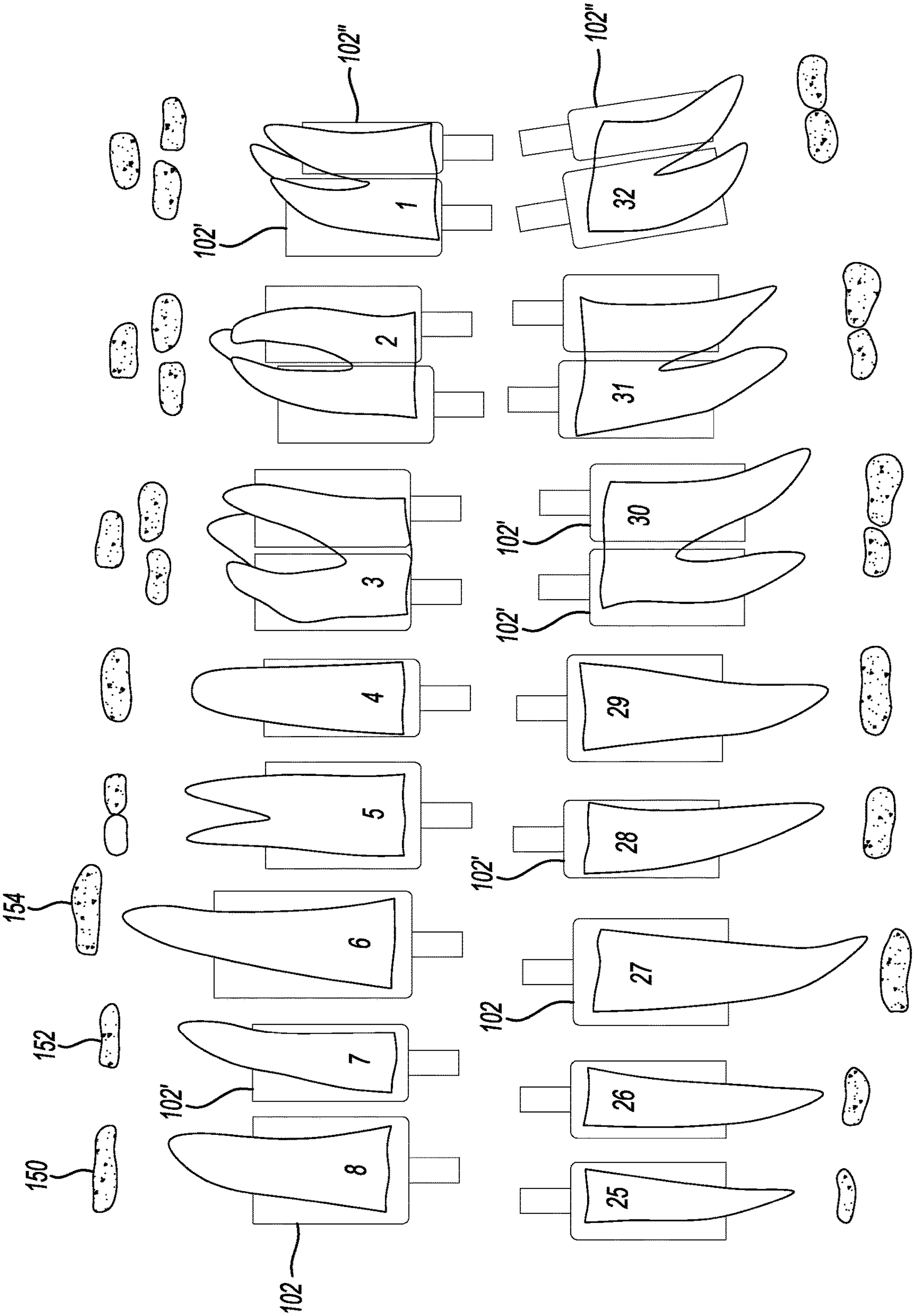
FIGS. 8A-8B depict corresponding drill ring rings or sleeves associated with each of the tooth and molars shown in FIGS. 7A-7B.
Figure 8B:
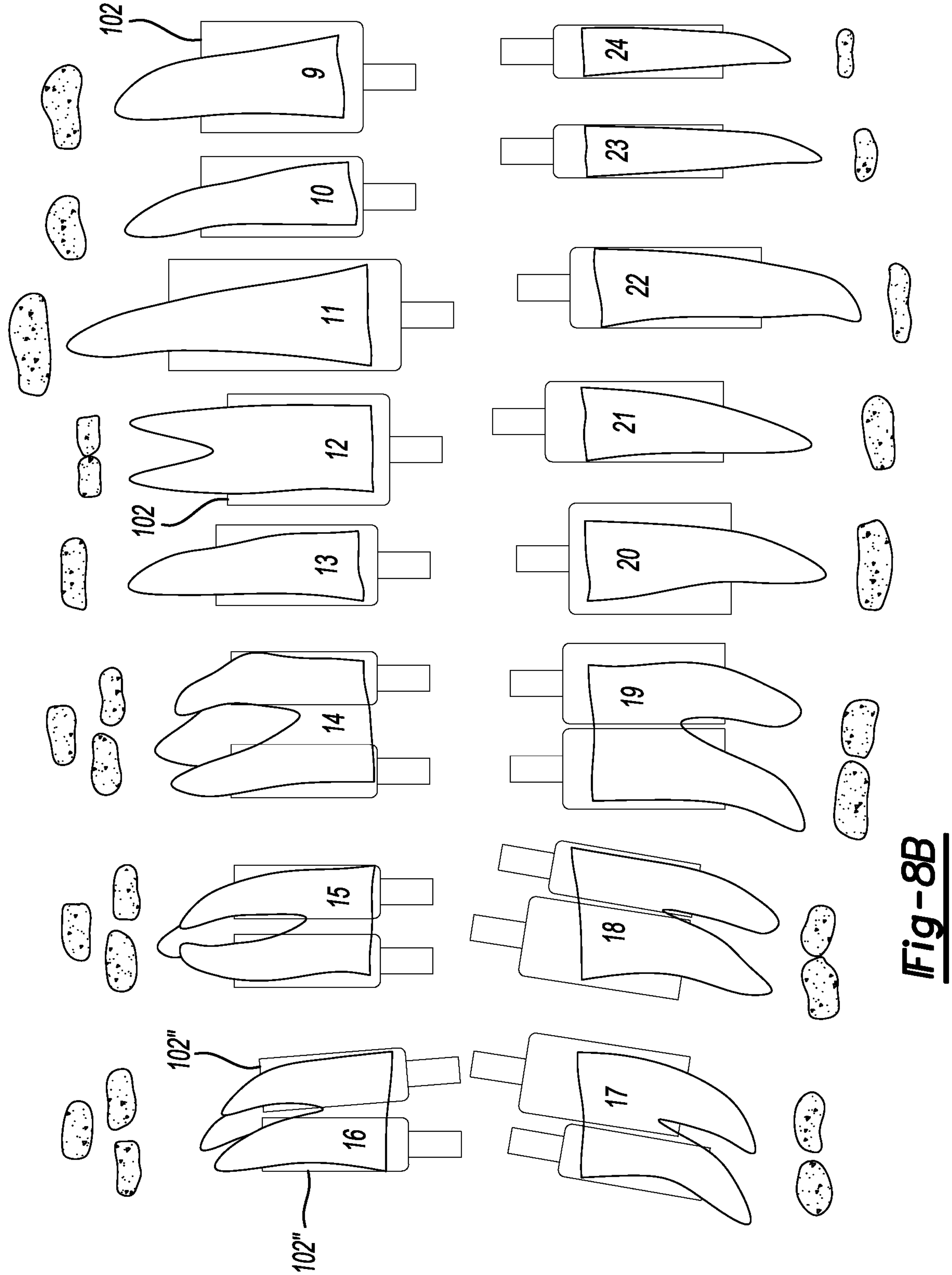

FIGS. 7A-7B illustrate upper and lower arrangements of teeth and molars as shown from each of first and second sides, with FIGS. 8A-8B depicting corresponding drill sleeves or rings (see again at 102, 102', 102", et seq.) associated with each of the tooth and molars shown in FIGS. 7A-7B for creating a three dimensional profile as shown in FIG. 4 for revealing any unique cross section of dental root (see for example in FIG. 8A at 150, 152, 154, et seq.). The collection of drill sleeves depicted further takes into account that any variety of sleeve can also include similar diameter sleeves of varying depth, in addition to varying diameter in order to form a three dimensional recessed concentric profile for revealing an embedded root tip of any shape or configuration for ease of removal by the forceps 146.

FIG. 7A depicts a right side view of both upper maxillary and lower mandibular teeth. The upper maxillary, from front to rear, includes upper molars 1-3, bicuspids 4-5, cuspid/canine 6, lateral incisor 7 and central incisor 8. The lower mandibular, from rear to front, includes central incisor 25, lateral incisor 26, cuspid/canine 27, bicuspids 28-29 and molars 30-32.

FIG. 7B depicts a left side view of both upper maxillary and lower mandibular teeth. The upper maxillary, from front to rear, includes central incisor 9, lateral incisor 10, cuspid/canine 11, bicuspids 12-13 and molars 14-16. The lower mandibular, from rear to front, includes molars 17-19, bicuspids 20-21, cuspid/canine 22, lateral incisor 23 and central incisor 24.

As again referenced in FIGS. 8A-8B, the same arrangement of teeth are shown with selected drill sleeves positioned for drilling an initial annular recess profile within the upper or lower jawbone surrounding the embedded root (such again typically occurring following removal of the upper tooth or crown).

The present invention also discloses a process for removing a dental root within a jawbone, including the steps of providing a plurality of drill sleeves, each having an overall length with an open toothed circular end profile, with each of the drill sleeves exhibiting a progressively decreasing diameter and attaching a first of the drill sleeves to a dental drill for drilling a first annular recess within the jawbone to reveal a first embedded portion of the root. Additional steps include attaching in succession, at least second and third drill sleeves for drilling second and third annular recesses within the jaw bone beyond the first annular recess in order to reveal second and third embedded portions of the root to collectively define a retrieval profile for substantially exposing the embedded root. Also disclosed is positioning a retrieval forceps having configured inserting portions adapted into the retrieval profile and gripping opposing surfaces of the root for facilitating subsequent removal of the root.

Other steps include removing a portion of any of a tooth, molar or crown above a gum line for revealing the jawbone containing the dental root and configuring the retrieval forceps to exhibit first and second handles terminating in the inserting portions, each having an opposing and curved shape.

Additional steps include forming one or more axial slots into each of the drill sleeves extending from the toothed circular end profile to an inner end wall defining a cylindrical shape of the drill sleeve in order to provide a measured degree of flex or bend during drilling within the jawbone. Also disclosed is the step of the drill sleeves each being constructed of a medical grade steel and/or a high carbon content sanitary plastic or similar outer coating applied over the steel. Also disclosed is the step of the latter drill sleeves drilling annular recesses within the jaw bone beyond the first or initial annular recessed further progressively remove outer portions of the dental root itself prior to removal of the remaining exposed root tip by the forceps.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as “including”, “comprising”, “incorporating”, “consisting of”, “have”, “is” used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader’s understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, “first”, “second”, “third”, “primary”, “secondary”, “main” or any other ordinary and/or numerical terms, should also be taken only as identifiers, to assist the reader’s understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A process for removing a dental root within a jawbone, comprising the steps of:

providing a plurality of drill sleeves, each having an overall length with an open toothed circular end profile, each of the drill sleeves exhibiting a progressively decreasing diameter;

attaching a first of the plurality of drill sleeves to a dental drill for drilling a first annular recess within the jawbone to reveal a first embedded portion of the root;

attaching in succession, at least a second and third of the plurality of drill sleeves for drilling second and third annular recesses within the jaw bone beyond the first annular recess in order to reveal second and third embedded portions of the root to collectively define a retrieval profile for substantially exposing the embedded root, wherein the second and third of the plurality of drill sleeves has a smaller diameter than the first of the plurality of drill sleeves;

positioning a retrieval forceps having pivotally associated jaws into the retrieval profile; and gripping opposing surfaces of the root for facilitating subsequent removal of the root.

2. The process according to claim 1, further comprising the step of removing a portion of any of a tooth, molar or crown above a gum line for revealing the jawbone containing the dental root.

3. The process according to claim 1, further comprising the step of configuring the retrieval forceps to exhibit first and second handles terminating in the pivotally associated jaws further including the jaws having opposing concave contours.

4. The process of claim 1, further comprising the step of forming one or more axial slots into each of said drill sleeves extending from the toothed circular end profile to an inner end wall defining a cylindrical shape of the drill sleeve in order to provide a measured degree of flex or bend during drilling within the jawbone.

5. The process of claim 1, further comprising the step of said drill sleeves each being constructed from either of a medical grade steel or a high carbon content sanitary plastic outer coating applied over the medical grade steel.

6. The process of claim 1, wherein the step of the second and third of the plurality of drill sleeves drilling second and third annular recesses within the jaw bone beyond the first annular recess progressively removes outer portions of the dental root prior to removal by the forceps.

* * * * *